United States Patent [19]

Anderson

[11] Patent Number: 5,364,134
[45] Date of Patent: Nov. 15, 1994

[54] END FITTING FOR FLEXIBLE CONDUIT

[75] Inventor: Neill E. Anderson, Valencia, Calif.

[73] Assignee: Anderson Barrows Metal Corporation, Palmdale, Calif.

[21] Appl. No.: 691,700

[22] Filed: Apr. 26, 1991

[51] Int. Cl.$^5$ ............................................. F16L 55/07
[52] U.S. Cl. ...................... 285/38; 285/242; 285/256; 285/334.3; 285/354; 277/110; 277/115; 277/117
[58] Field of Search ............... 285/39, 242, 249, 354, 285/259, 334.3, 256; 277/102, 110, 115, 117, 120

[56] References Cited

U.S. PATENT DOCUMENTS

| | | | |
|---|---|---|---|
| 140,374 | 7/1873 | Kennedy | 285/259 X |
| 494,801 | 4/1893 | Weber | 285/354 X |
| 782,552 | 2/1905 | Glauber | 285/298 |
| 922,471 | 5/1909 | Glauber | 285/334.3 X |
| 964,579 | 7/1910 | Stephens | 285/354 X |
| 1,235,876 | 8/1917 | Cave | 285/259 X |
| 1,337,427 | 4/1920 | Beach | 285/334.3 X |
| 1,347,834 | 7/1920 | Barber | 285/334.3 |
| 2,131,509 | 9/1938 | Goepel et al. | 285/379 X |
| 2,248,576 | 7/1941 | McConnohic | 285/259 X |
| 2,449,916 | 9/1948 | Tandet | 285/249 |
| 2,477,533 | 7/1949 | Whiting | 285/334.3 X |
| 3,442,537 | 5/1969 | Courtot et al. | 285/256 X |
| 3,685,860 | 8/1972 | Schmidt . | |
| 3,698,745 | 10/1972 | Mundt | 285/256 |
| 3,830,531 | 8/1974 | Burge . | |
| 3,834,742 | 9/1974 | McPhillips . | |
| 3,903,335 | 9/1975 | Burge et al. . | |
| 3,915,479 | 10/1975 | Sotolongo . | |
| 4,030,778 | 6/1977 | Kaut, Jr. | 285/354 X |
| 4,032,177 | 6/1977 | Anderson . | |
| 4,270,777 | 6/1981 | Fisher | 285/242 |
| 4,369,992 | 1/1983 | Fournier et al. | 285/259 X |
| 4,549,755 | 10/1985 | Kot et al. | 285/354 X |
| 4,589,688 | 5/1986 | Johnson | 285/256 X |
| 4,861,076 | 8/1989 | Newman et al. | 285/332.3 |
| 4,991,876 | 2/1991 | Mulvey | 285/354 X |
| 5,024,419 | 6/1991 | Mulvey | 285/354 X |

FOREIGN PATENT DOCUMENTS

| | | | |
|---|---|---|---|
| 0618790 | 4/1961 | Canada | 285/334.3 |
| 0412677 | 2/1991 | European Pat. Off. | 285/249 |
| 0721163 | 12/1954 | United Kingdom | 285/356 |

*Primary Examiner*—Randolph A. Reese
*Assistant Examiner*—Heather H. Shackelford
*Attorney, Agent, or Firm*—Poms, Smith, Lande & Rose

[57] ABSTRACT

An end fitting for flexible conduit or the like includes a generally cylindrical conduit insert which has a retainer rim, a journal barrel, and a base ring. The retainer rim and journal barrel are inserted into the conduit up to the base ring. A crimp ring dimensioned to engage the outer surface of the conduit, press fits the conduit to the journal barrel. The retainer rim being of a diameter larger then the diameter of the journal barrel prevents removal of the insert past the crimp ring. The base ring also being of a larger diameter than the journal barrel limits the depth of insertion of the insert into the conduit. The conduit insert further has a force flange and a tip which extend outward from the base ring. A cone washer is received by the tip and abuts a first surface of the force flange. A threaded cap has an end wall with a coaxial bore which is in rotatable engagement with the base ring with the end wall engaging a second surface of the force flange. The threaded cap further has an outer digitally engageable surface so that the conduit may be installed or removed without the use of tools.

25 Claims, 2 Drawing Sheets

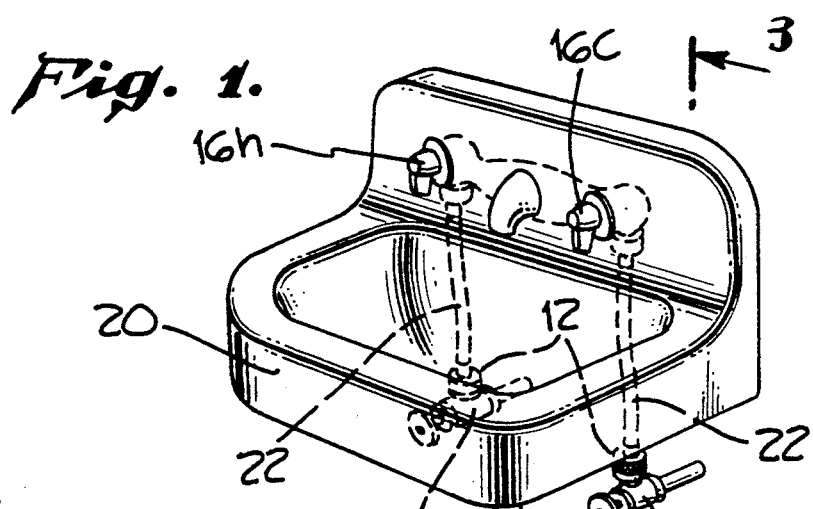
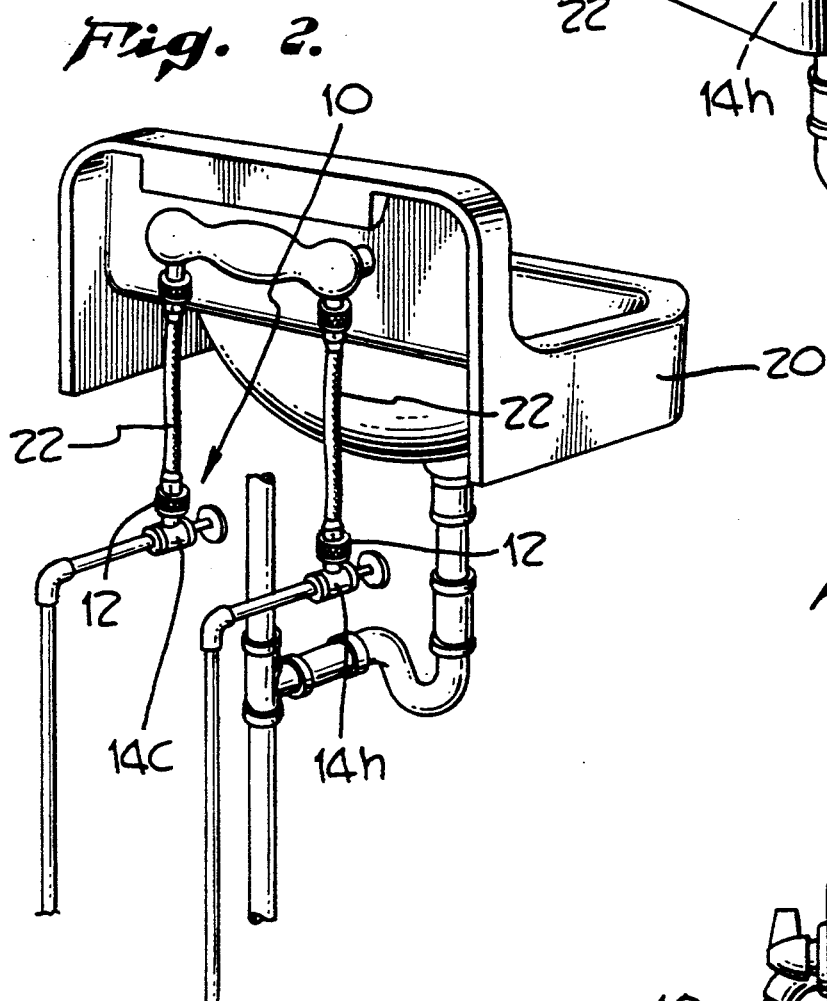
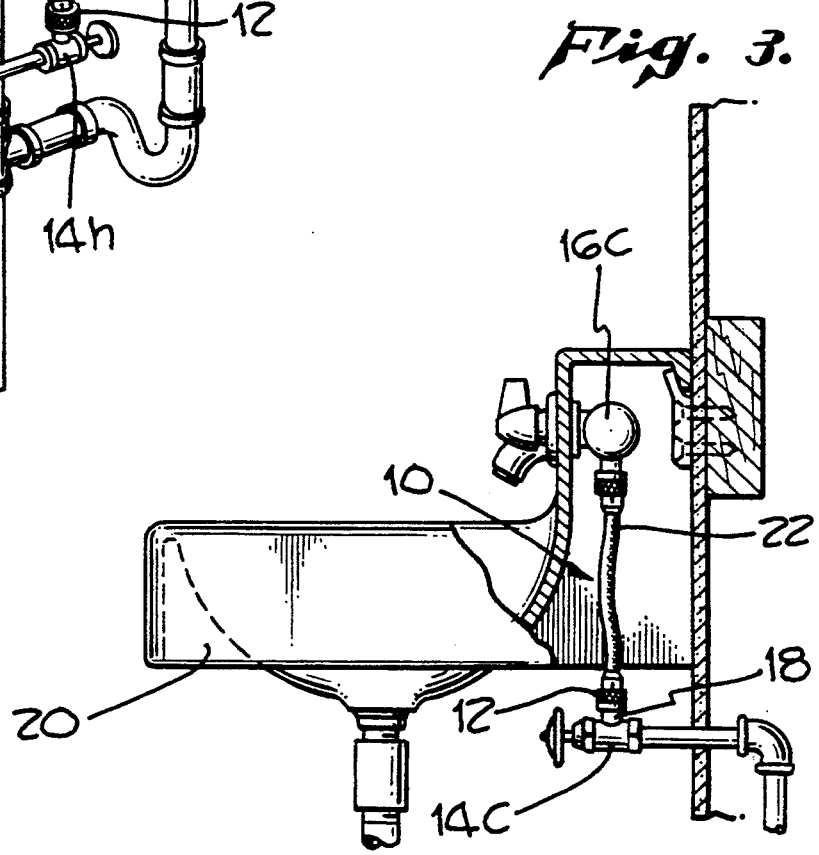

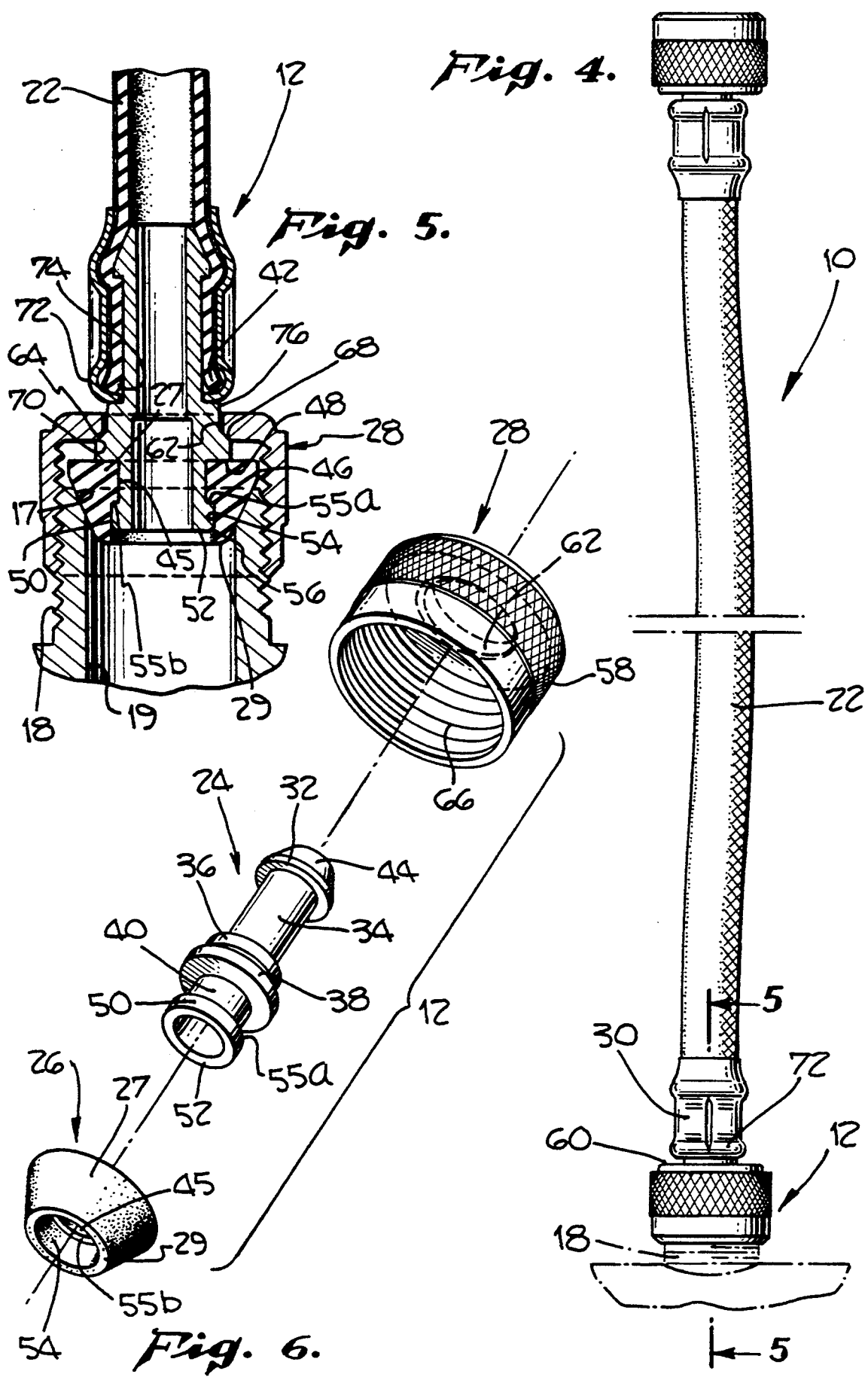

END FITTING FOR FLEXIBLE CONDUIT

FIELD OF INVENTION

The present invention relates generally to end fittings and more particularly to an end fitting for flexible conduit of the type used in faucet supply line assemblies.

BACKGROUND OF INVENTION

Various types of end fittings have been used for joining nonmetal flexible conduit to a valve body fitting wherein a tubing reinforcing insert is employed. Examples thereof are U.S. Pat. Nos. 3,830,531, 3,834,742, 3,903,335, 3,915,479 and 3,685,860. In each of these patents, means are provided on the tubing insert for holding it in a removable press fit relationship to the fitting tubing receiving bore or throughbore so that the tubing insert is substantially aligned with the preassembled nut sub-assembly normally employed in compression type fittings.

In U.S. Pat. No. 4,032,177, another type of compression-type end fitting for a nonmetal flexible tubing is disclosed. The fitting includes a tubing receiving bore terminating at an internal stop shoulder with a continuing smaller diameter through bore, a nut sub-assembly of the nut and compression sleeve, which has a tubing reinforcing insert loosely retained within the body and the nut subassembly when the latter are preassembled preparatory to receiving the tubing through the nut sub-assembly. The compression sleeve has a nut receiving throughbore. The insert has a circular flange for loosely retaining the insert within the fitting body bore and has a guide end protruding outwardly of the nut sub-assembly when the latter is assembled to the fitting body to provide for an initial engagement with the tubing and for pre-aligning of the tubing, inset and nut sub-assembly throughbore preparatory to pressing the tubing into the fitting and final tightening of the nut sub-assembly onto the fitting through its use of a suitable hand manipulated tool such as a crescent wrench.

SUMMARY OF INVENTION

It is an object of the present invention to provide a flexible conduit end fitting which is relatively easy to assemble. It is a further object of the present invention to provide an undersink faucet supply line assembly which does not require tools for installation or removal.

According to the present invention, an end fitting for flexible conduit or the like includes a generally cylindrical conduit insert which has a retainer rim, a journal barrel, and a base ring. The retainer rim and journal barrel are inserted into the conduit up to the base ring. A crimp ring, dimensioned to engage the outer surface of the conduit, press fits the conduit to the journal barrel. The retainer rim being of a diameter larger then the diameter of the journal barrel prevents removal of the insert past the crimp ring. The base ring also being of a larger diameter than the journal barrel limits the depth of insertion of the insert into the conduit. The conduit insert further has a force flange and a tip which extend outward from the base ring. A cone washer is received by the tip and abuts a first surface of the force flange. A threaded cap has an end wall with a coaxial bore which is in rotatable engagement with the base ring with the end wall engaging a second surface of the force flange. The threaded cap further has an outer digitally engageable surface so that the conduit may be installed or removed without the use of tools.

By installing at each end of a flexible conduit the novel end fitting of the present invention, an undersink faucet supply line assembly which does not require the use of tools for installation or removal is provided. The cone washer abuts the valve fitting inlet or outlet and makes a sufficient seal when the threaded cap is tightened by hand. An advantage of the novel and fitting of the present invention is the elimination of the need for wrenches in the cramped undersink environment in which the present invention is to be used.

These and other objects, advantages, and features of the present invention will become readily apparent to those skilled in the art from the following Description of an Exemplary Preferred Embodiment when read in conjunction with the attached Drawing and appended claims.

BRIEF DESCRIPTION OF THE DRAWING

FIG. 1 is a perspective view of a sink basin showing faucet valves and supply valves interconnected by a faucet supply line assembly incorporating the novel end fitting of the present invention;

FIG. 2 is a perspective view shown from the rear of FIG. 1;

FIG. 3 is a view taken along line 3—3 of FIG. 1;

FIG. 4 is an enlarged broken elevational view of the faucet supply line assembly seen in FIG. 2;

FIG. 5 is a cross-sectional view taken along line 5—5 of FIG. 4 showing the end fitting constructed according to the principles of the present invention; and FIG. 6 is an exploded view of a portion of the end fitting of the present invention.

DESCRIPTION OF AN EXEMPLARY PREFERRED EMBODIMENT

Referring now to FIGS. 1-3, there is shown a typical environment in which the faucet supply line assembly 10 incorporating the novel end fitting 12 is used. Typically, the faucet supply line assembly 10 is used to make connection between the cold water shut-off valves 14c and a cold water faucet valve 16c, or between the hot water shut-off valve 14h, and the hot water faucet valve 16h. As is well known, each valve 14, 16 has a threaded male fitting 18, as best seen in FIG. 5.

The faucet supply line assembly 10 is threaded onto each threaded male fitting 18 to make connection thereto. Since the distance separating the shut-off valves 14 from the faucet valves 16 varies at each installation of the sink 20, the faucet supply line assembly 10 includes a flexible conduit 22. The flexible conduit 22 usually constructed from a plastic fiber strand wound or stainless steel wound tube of suitable material.

With further reference to FIGS. 4-6, the novel end fitting 12 for the faucet supply line assembly 10 is described in detail. Generally, the end fitting 12 includes a generally cylindrical conduit insert 24, a cone washer 26, a threaded cap 28, and a crimp ring 30.

The conduit insert 24 has a retainer rim 32, a journal barrel 34, a base ring 36, a force flange 38, and a tip 40. More particularly, the journal barrel 34 is disposed intermediate the retainer rim 32 and the base ring 36. The force flange 38 is disposed intermediate the base ring 36 and the tip 40. Each of the retainer rim 32 and the journal barrel 34 are dimensioned for insertion into one of the pair of ends 42 of the conduit 22, as best seen in FIG. 5.

The journal barrel 34 has a diameter less than the diameter of each of the retainer rim 32 and the base ring 36. Furthermore, the retainer rim 32 has a frustoconical extension 44. The frustoconical extension 44 extends outwardly from the retainer rim 32 to facilitate insertion of the conduit insert 24 into the end 42 of the tube 22. The diameter of the base ring 36 is selected so that the base ring 36 limits the depth of insertion of the insert 24 into the conduit 22.

To mount the cone washer 26 onto the insert 24, the cone washer 26 has a bore 45 which is received by the tip 40. The cone washer 26 also has a disk-shaped back portion 46 which abuts a first surface 48 of the force flange 38. To securely mount the cone washer 26 to the tip 40, the tip 40 has a retainer ring 50 at a forward edge 52 of the insert 24. Furthermore, the cone washer 26 has a counterbore 54 to receive the retainer ring 50. A rim 55a formed between the tip 40 and retainer ring 50 and a rim 55b formed between the bore 45 and counterbore 46 are mutually mateable to mount the cone washer axially on the tip 40 between the force flange 38 and retainer ring 50. Since the cone washer 26 is typically made of elastomeric material, the bore 45 slips easily over the retainer ring 50. To facilitate the mounting of the cone washer 26 on the tip, the retainer ring has a bevelled edge 56 at the front edge 52 of the insert as best seen in FIG. 5. As best seen in FIG. 6, the cone washer 26 is provided with a conical sealing surface 27 which tapers from the larger rear end disk-shaped back portion 46 to the smaller front end portion 29. As best seen in FIG. 5, the front end portion 29 enters the bore 19 of the threaded male fitting 18 with the conical sealing surface 27 sealing on the internally bevelled open end 17 of the fitting 18 when the end fitting of the present invention is assembled to such fitting 18.

As best seen in FIGS. 5-6, the threaded cap 28 is received over the insert 24 prior to insertion of the insert 24 into the end 44 of the tube 22. More particularly, the threaded cap 28 has a digitally engageable surface 58, and end wall 60 and a coaxial bore 62 in the end wall 60. The coaxial bore 62 is dimensioned for rotatable engagement with the base ring 36. The end wall 60 engages a second surface 64 of the force flange 38. As best seen in FIG. 5, the force flange 38 has a diameter greater than the base ring 36 to hold the cap 28 in position. Prior to positioning the insert 24 into an end 42 of the conduit 22, the cap 28 is placed over the insert 22 by receiving the journal barrel 34 through the coaxial bore 62. The threaded cap 28 has internal threads 66 which are threadingly received by the threaded extension of one of the valves 14, 16. The digitally engageable surface 58 may, in a preferred embodiment of the present invention, be a knurled surface which is easily gripped by the fingertips during installation of the faucet supply line assembly 10.

The second surface 64 of the force flange 38 has a bevelled edge 68, as best seen in FIG. 5. The end wall 60 of the cap 28 has a countersink 70. The countersink 70 is coaxial with the coaxial bore 62. The countersink 70 is dimensioned to receive the bevelled edge 68 of the force flange 38 in rotatable slidable engagement. When the cap 28 is threaded onto the male fitting 18 the engagement of the countersink 70 to the bevelled edge 68 pushes the insert (with the tube 22 attached) into the valve 14 and 16 until the cone washer 26 makes engagement within the male fitting 18. As the cap 28 is tightened, the cone washer 26 is pushed by the first surface 48 of the force flange 38 into engagement with the male fitting 18 to provide a water tight seal.

So that the end 42 of the conduit 22 stays mounted to the journal barrel 34, the crimp ring 30 is dimensioned to engage the outer surface of the conduit 22 and press fit the end 42 of the conduit 22 to the journal barrel 34. The retainer rim 32 prevents further removal of the conduit insert 24 past the crimp ring. Furthermore, the base ring 36 limits the depth of insertion of the conduit insert 24 into the tube 22.

As best seen in FIG. 5, the crimp ring 30 also extends over the frustoconical extension 44. The end 42 of the conduit 22 is further press fitted to the frustoconical extension 44 to mount more securely the conduit insert 24 within the conduit 22. Finally, the crimp ring 30 has a generally arcuate flange 72. The arcuate flange 72 extends intermediate an edge 74 of the conduit 22 and an edge 76 of the base ring 36. The arcuate flange 72 is also in rotatable engagement with the journal barrel 34.

There has been described hereinabove a novel faucet supply line assembly and the novel end fitting therefore. It is readily apparent that those skilled in the art may now make numerous uses of and departures from the above-described exemplary preferred embodiment of the present invention without departing from the inventive concepts disclosed herein. Accordingly, the present invention is to be defined solely by the scope of the following claims:

I claim:

1. An end fitting for flexible conduit and the like, for effecting a water tight seal between said conduit and the bore of an externally threaded water faucet fitting, said bore having an entry position, said end fitting comprising:

a generally cylindrical conduit insert having a retainer rim, a journal barrel, a base ring, a force flange and a tip, said journal barrel being disposed intermediate said retainer rim and said base ring, said force flange being disposed intermediate said base ring and said tip, said retainer rim and said journal barrel being of a dimension for insertion into an end of said conduit;

a cone washer having a washer bore, a disk shaped back portion, a conical sealing surface and a front end portion, said washer bore being received by said tip, said back portion abutting a first surface of said force flange and said conical surface tapering from said back portion to said front portion which is smaller than said back portion;

a threaded cap to fit onto said faucet fitting and having an outer digital engaging surface, an end wall and a coaxial bore in said end wall, said coaxial bore being of a dimension for rotatable engagement with said base ring, said end wall engaging a second surface of said force flange; and a crimp ring of a dimension to engage an outer surface of said conduit and press fit said end of said conduit to said journal barrel, said retainer rim preventing removal of said insert past said crimp ring, said base ring limiting the depth of insertion of said insert into said conduit whereby manual rotation of said cap onto said faucet fitting causes said cap to push against said insert and said insert to push against said cone washer and said cone washer front end to be pushed into said faucet bore with said conical surface sealing against said entry portion of said bore.

2. An end fitting as set forth in claim 1 wherein said second surface of said force flange has a bevelled edge and said end wall of said cap has a countersink coaxial with said bore, said countersink being dimensioned to receive said bevelled edge in rotatably slidable engagement.

3. An end fitting as set forth in claim 1 wherein said retainer rim has a frustoconical extension extending coaxially outwardly therefrom to facilitate insertion of said insert into said conduit.

4. An end fitting as set forth in claim 3 wherein said crimp ring extends over said frustoconical extension to press fit said conduit to said frustoconical section.

5. An end fitting as set forth in claim 1 wherein said journal barrel has a diameter less than a diameter of each of said retainer rim and said base ring.

6. An end fitting as set forth in claim 1 wherein said force flange has a diameter greater than a diameter of said base ring.

7. An end fitting as set forth in claim 1 wherein said cap is received by said base ring prior to insertion of said insert into said conduit.

8. An end fitting as set forth in claim 1 wherein said crimp ring has a generally arcuate flange extending intermediate an end of said conduit and an end of said base ring.

9. An end fitting as set forth in claim 1 wherein said digitally engageable surface is a knurled surface.

10. An end fitting for flexible conduit and the like, said fitting comprising:
   a generally cylindrical conduit insert having a retainer rim, a journal barrel, a base ring, a force flange and a tip, said journal barrel being disposed intermediate said retainer rim and said base ring, said force flange being disposed intermediate said base ring and said tip, said retainer rim and said journal barrel being of a dimension for insertion into an end of said conduit;
   a cone washer having a bore and a disk shaped back portion, said bore being received by said tip, said back portion abutting a first surface of said force flange;
   a threaded cap having an outer digital engaging surface, an end wall and a coaxial bore in said end wall, said bore being of a dimension for rotatable engagement with said base ring, said end wall engaging a second surface of said force flange; and
   a crimp ring of a dimension to engage an outer surface of said conduit and press fit said end of said conduit to said journal barrel, said retainer rim preventing removal of said insert past said crimp ring, said base ring limiting the depth of insertion of said insert into said conduit, wherein said tip has a retainer ring at an edge of said insert and said cone washer has a counter bore therein to receive said retainer ring.

11. An end fitting as set forth in claim 10 wherein said retainer ring has a bevelled edge at said edge of said insert to facilitate mounting of said cone washer to said tip.

12. A faucet supply line assembly for connecting a faucet valve to a shut-off valve each of said valves having a valve fitting including a cap receiving threaded exterior and a cone washer receiving internal fitting bore having an internally beveled open bore end, said assembly comprising:
   a flexible conduit of a length sufficient to extend between each valve, said tube having a pair of ends;
   a generally cylindrical conduit insert disposed within and at each end of said tube, said insert having a retainer rim, a journal barrel, a base ring, a force flange, and a tip, said journal barrel being disposed intermediate said retainer rim and said base ring, said force flange being disposed intermediate said base ring and said tip, said retainer rim and said journal barrel being of a dimension for insertion into a respective end of said tube;
   a cone washer mounted on each insert, each cone washer having a washer bore, a front end portion, a conical sealing surface and a disk-shaped back portion, said washer bore being received by said tip and said back portion abutting a first surface of said force flange;
   an internally threaded cap mounted on each inert, each cap having a digitally engaging surface, an end wall and a coaxial bore, said coaxial bore being of a dimension for rotatable engagement with said base ring, said end wall engaging the second surface of said force flange; and
   a crimp ring holding each insert within said conduit, each ring being of a dimension to engage an outer surface of said conduit and to press fit said respective end of said conduit tube to said journal barrel, said retainer rim preventing removal of said insert past said crimp ring, said base ring limiting depth of insertion of said insert into said respective end of said tube whereby manual rotation of said cap onto a threaded valve fitting associated with either said faucet valve forces said insert via said force flange to wedge said cone washer front end into the associated valve fitting internal fitting bore and said conical sealing surface into a water tight wedging engagement and with said internally beveled open bore end of said valve fitting.

13. An end fitting as set forth in claim 12 wherein said second surface of said force flange has a bevelled edge and said end wall of said cap has a countersink coaxial with said bore, said countersink being dimensioned to receive said bevelled edge in rotatably slidable engagement.

14. An end fitting as set forth in claim 12 wherein said retainer rim has a frustconical extension extending coaxially outwardly therefrom to facilitate insertion of said insert into said conduit.

15. An end fitting as set forth in claim 14 wherein said crimp ring extends over said frustoconical extension to press fit said conduit to said frustoconical extension.

16. An end fitting as set forth in claim 12 wherein said journal barrel has a diameter less than each of said retainer rim and said base ring.

17. An end fitting as set forth in claim 12 wherein said force flange has a diameter greater than said base ring.

18. An end fitting as set forth in claim 12 wherein said cap is received by said base ring prior to insertion of said insert into said conduit.

19. An end fitting as set forth in claim 12 wherein said crimp ring has a generally arcuate flange extending intermediate an end of said conduit and an end of said base ring.

20. An end fitting as set forth in claim 12 wherein said digitally engageable surface is a knurled surface.

21. A faucet supply line assembly for connecting a faucet valve to a shut-off valve comprising:.
   a flexible conduit of a length sufficient to extend between each valve, said tube having a pair of ends;

a generally cylindrical conduit insert disposed within and at each end of said tube, said insert having a retainer rim, a journal barrel, a base ring, a force flange, and a tip, said journal barrel being disposed intermediate said retainer rim and said base ring, said force flange being disposed intermediate said base ring and said tip, said retainer rim and said journal barrel being of a dimension for insertion into a respective end of said tube;

a cone washer having a bore and a disk-shaped back portion, said bore being received by said tip and said back portion abutting a first surface of said force flange;

a threaded cap having a digitally engaging surface, an end wall and a coaxial bore, said bore being of a dimension for rotatable engagement with said base ring, said end wall engaging the second surface of said force flange; and a crimp ring of a dimension to engage an outer surface of said conduit and to press fit said respective end of said conduit tube to said journal barrel, said retainer rim preventing removal of said insert past said crimp ring, said base ring limiting depth of insertion of said insert into said respective end of said tube, wherein said tip has a retainer ring at an edge of said insert and said cone washer has a counter bore therein to receive said retainer ring.

22. An end fitting as set forth in claim 21 wherein said retainer ring has a bevelled edge at said edge of said insert to facilitate mounting of said cone washer to said tip.

23. A faucet supply line assembly to interconnect a shut-off valve to a faucet valve fitting having an internally beveled open end, said assembly comprising:

a flexible conduit having a pair of ends;

a pair of end fittings, each of said end fittings being disposed at a respective one of said ends, each of said end fittings including a conduit insert, a threaded cap mounted on the insert and having an internal thread to engage a male threaded fitting on said valves and a digitally engaging surface to manually grip said cap for installation and removal of said supply line from said valves;

a force flange on the conduit insert of each of said pair of end fittings engaged by the associated cap; and a cone washer mounted on each insert, each such cone washer having a front portion, a back portion and a conical external sealing surface tapering downwardly from said back portion to said front portion which is smaller in diameter than said back portion, each said cone washer being mounted on each insert with said back portion being against the associated force flange and said front portion facing axially outwardly of the associated one of said end fittings whereby interconnection of each of said end fittings to each of said valves causes each cap to force the associated insert force flange against the associated cone washer to effect a water tight seal without rotational engagement between the cap and washer, through a wedging of said conical external sealing surface of said cone washer against said internally beveled open end.

24. A faucet supply line as set forth in claim 23 wherein said digitally engageable surface is a knurled surface.

25. An end fitting for a flexible conduit to be threaded onto an externally threaded male fitting having an internally beveled bore open end, said end fitting comprising:

a conduit insert to be inserted at the end of a conduit and having a force flange and a tip;

a cone washer having a washer bore to fit said washer onto said insert tip on one side of said force flange, said cone washer including a disk-shaped back portion seated against said force flange, a smaller front end facing away from said flange and a conical sealing surface extending between said front end back portions;

a threaded cap having an end wall to engage said force flange on another side thereof; and a crimp ring about said conduit to hold the assembled washer and insert to said conduit whereby rotation of said cap onto said male fitting will push said insert against said cone washer and thereby push said cone washer conical sealing surface into engagement with said internal beveled bore open end in a fluid tight wedging seal therebetween in response to manual rotation of said cap onto said fitting.

* * * * *